Patented Aug. 17, 1926.

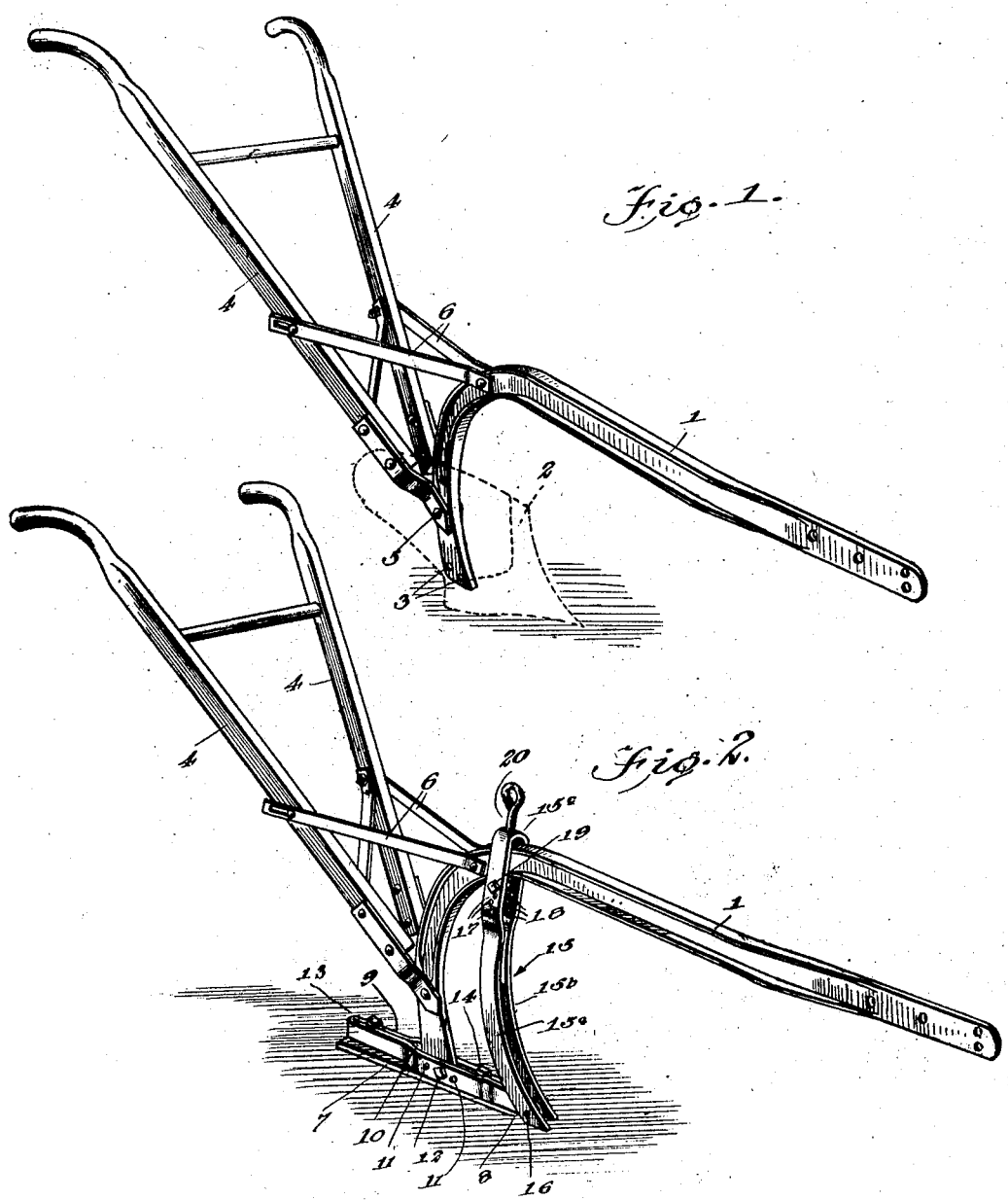

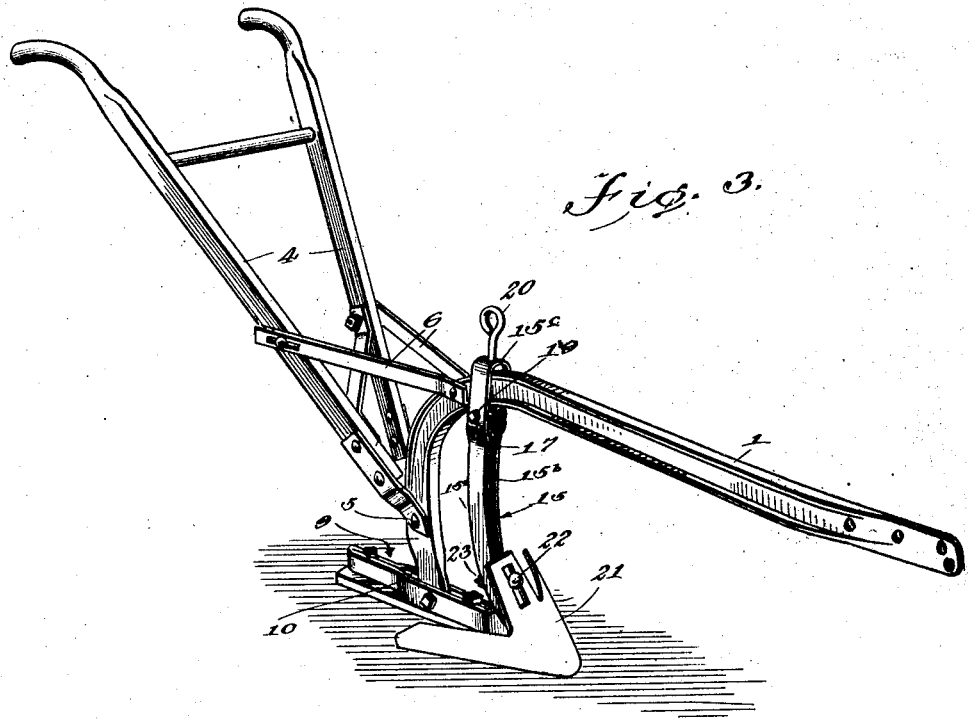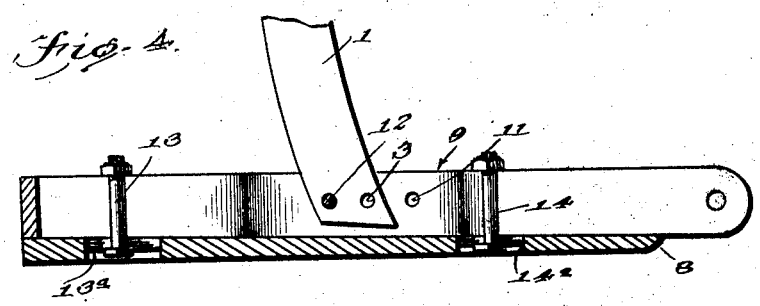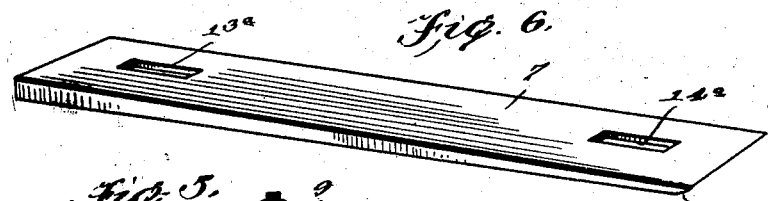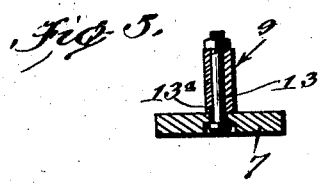

1,596,825

UNITED STATES PATENT OFFICE.

WILLIAM J. GALES, OF FAYETTEVILLE, NORTH CAROLINA.

ATTACHMENT FOR PLOWS.

Application filed March 21, 1925. Serial No. 17,289.

My invention relates to improvements in plows, more particularly to plows of the type including a beam carrying a removable plowshare for breaking or turning the soil, and it consists in the combinations, constructions and arrangements herein described and claimed.

An object of the invention is the provision of an attachment for the beam of a plow of the character described which is adapted to be secured to the plow beam after the usual plowshare has been detached from the beam and which then will afford facilities for supporting a blade for shallow cultivation for use with the plow beam.

A further object of the invention is the provision of an attachment of the character described which is adapted when operatively applied to a plow beam to be adjusted to vary the depth which the blade that is supported thereon will cut into the soil.

A further object of the invention is the provision of an attachment of the character described which is adapted to be applied to the beam of an ordinary general purpose or "turn" plow after the usual plowshare has been removed from the beam without any changes in the construction of the plow beam being required.

Other objects and advantages will be apparent from the following description, considered in conjunction with the accompanying drawings, in which Figure 1 is a perspective view showing the essential parts of a walking plow of ordinary construction with the plowshare shown in dotted lines.

Figure 2 is a view similar to Figure 1 with the usual plowshare of the walking plow omitted and the improved attachment for supporting a shovel or "sweep" blade operatively connected with the plow beam.

Figure 3 is a view similar to Fig. 2, showing the shovel or "sweep" blade in place.

Figure 4 is a longitudinal vertical section through the runner of the attachment, showing the manner of connecting the runner to the lower end of the plow beam.

Figure 5 is a transverse section through the runner and the attaching member thereon, and Figure 6 is a perspective view of the runner alone.

The walking plow shown in Figure 1 is of ordinary construction and comprises a steel beam 1 which has the rearward end portion thereof curved substantially along the arc of a circle and turned downward for attachment to a plowshare 2, the curved portion of the beam being provided adjacent to its extremity with openings 3 spaced transversely thereof for the reception of bolts (not shown) which may be employed to secure the plowshare to the beam. A pair of handle bars 4 is provided, the respective bars being attached, as at 5 to the curved portion of the beam 1 adjacent to the extremity of the latter and being stayed to the beam by bracing members 6.

An attachment embodying the invention comprises a flat runner 7 which is formed with the lower face thereof beveled at the forward end of the runner, as at 8. An attaching member 9 for fastening the runner 7 to the beam 1 is superimposed upon the runner and preferably has a length slightly greater than that of the runner, the rearward ends of the runner and the attaching member 9 being substantially flush while the attaching member extends at its forward end beyond the forward end of the runner. The attaching member 9 may be formed in one piece bent to provide a pair of flatwise juxtaposed bars having the intermediate portions thereof oppositely offset, thus producing a vertical slot at 10 in the attaching member 9 intermediate the length of the attaching member. The slot 10 is adapted to receive the rearward and lower end portions of the beam 1. The attaching member 9 is provided with a series of transverse openings 11 which intersect the slot 10. The lower end portion of the beam 1 may be arranged in the slot 10 with either one of the transverse openings 3 in alignment with the opposite end portions of any one of the openings 11 and a suitable fastening device, such as the bolt 12 can be extended through said aligned openings to attach the member 9 to the plow beam. The member 9 is rigidly fastened to the runner 7 in any suitable known manner as by means of a bolt 13 extending through vertically aligned slots 13ª in the rearward end portion of the runner and attaching member and a second bolt 14 having the shank thereof extending through the vertical slot 10 and through a slot 14ª in the underlying portion of the runner, the heads of the bolts 13 and 14 being countersunk with respect to the lower side of the runner 7 and the upper end portions of the bolts 13 and 14 of course being provided with nuts in threaded engagement therewith.

The attachment also comprises a standard indicated generally at 15 which consists of a pair of spaced arms 15$^a$ and 15$^b$ respectively having the upper end portions thereof outwardly offset and merged one into the other at their upper ends by a web portion 15$^c$. The arms 15$^a$ and 15$^b$ have the lower end portions thereof disposed in straddling relation to the forward end portion of the attaching member 9 and are attached to the latter by means of a pivot bolt 16 which extends through aligned transverse openings in the lower end portion of the arms 15$^a$ and 15$^b$ and the forward end portion of the attaching member 9. The plow beam 1 extends loosely through the space between the oppositely offset upper end portion of the arms 15$^a$, 15$^b$. A vertical series of spaced openings 17 is provided in the offset upper end portion of the arm 15$^a$ and a similar vertical series of spaced openings 18 is provided in the offset upper end portion of the arm 15$^b$, corresponding openings 17 and 18 being aligned and adapted to receive a bolt 19 which spans the space between the oppositely offset upper end portions of the arms 15$^a$ and 15$^b$ underneath the plow beam 1. A clamping screw 20 is threaded through a vertical opening in the web portion 15$^c$ of the standard and engages at its lower end with the upper side of the plow beam. The clamping screw 20 is tightened to cause such upward movement of the standard and of course of the forward end of the attaching member 9 and runner 7 as is necessary to cause the bolt 19 to be clamped against the underside of the plow beam 1 and the plow beam and standard thus held against relative movement. The extent of upward movement of the standard 15 in respect to the plow beam can be varied by changing the position of the bolt 19 vertically on the standard.

A blade for shallow cultivation, such as the cultivation of cotton plants or like work may have any desirable and suitable shape and can be attached to the standard 15. The so-called "sweep" blade for use in cultivating cotton is shown in full lines at 21 in Figure 3 and is attached to the standard 15 by means of a bolt 22 which extends through an opening in the shank of the blade and through the space between the lower end portions of the arms 15$^a$ and 15$^b$ and it engages at its rearward end by a nut 23 which bears against the rearward edges of the arms 15$^a$ and 15$^b$ whereby the blade will be clamped to the standard and may be adjusted vertically on the standard. It is to be observed at this point that the standard 15 is curved substantially along the arc of a circle from its lower to its upper end, the forward or front edges of the arms 15$^a$ and 15$^b$ being concavely curved longitudinally thereof so that the angle of inclination of the blade to the horizontal will be relatively slight when the blade is secured to the standard 15 at the lower end of the standard. This angle of inclination of the blade to the horizontal determines the depth which the blade will cut into the soil and can be varied by adjusting the position of the upper end of the standard 15 along the plow beam 1 as well as by adjusting the effective length of the standard by manipulation of the bolts 19 and 20 in the manner hereinbefore described.

From the foregoing description of the various parts of the device, the operation thereof may be readily understood. By means of the improved attachment, a blade for shallow cultivation can be quickly and easily attached to the beam of a plow for general soil breaking work. The same plow beam therefore may be used at different times with the usual plowshare for breaking or turning the soil and with a shallow blade for cultivating cotton or like work. The work of removing the usual plowshare from the beam and connecting the attachment which carries a shallow blade to the plow beam may be accomplished quickly without the use of any special tools and the shallow blade can be adjusted to till the soil according to varying requirements.

I claim:—

1. An attachment for a plow beam having a downwardly turned rear end portion, comprising a substantially flat runner, an attaching member superimposed on said runner and having a longitudinal slot intermediate its length for the reception of the lower end portion of the plow beam, means connecting the lower end portion of the plow beam adjustably and pivotally with said attaching member, whereby the plow beam will be supported on said runner, a standard comprising a pair of vertical arms straddling the plow beam adjacent to the upper end and straddling the forward end portion of the attaching members adjacent to their lower ends, and a web portion connecting the arms of the standard one to the other at their upper ends, a pivot element attaching the lower portions of the arms of the standard to the forward end portion of said attaching member, and means carried by the standard for engaging with the plow beam to secure the upper end portion of the standard to the plow beam in adjusted position along the plow beam, said standard being adapted to support a cultivating blade.

2. An attachment for a plow beam having a downwardly turned rearward end portion, comprising a substantially flat runner having the lower face thereof beveled at its forward end, an attaching member superimposed on the runner and secured thereto, said attaching member being formed with a longitudinal slot intermediate its length for the reception of the lower end portion of the plow beam, said lower end portion of the plow beam having a plurality of transversely spaced openings and said attaching member having a plurality of spaced transverse openings intersecting said vertical slot, a bolt adapted to be extended through aligned transverse openings of the attaching member and the lower end portion of the plow beam to pivotally attach the attaching member to the plow beam, and a standard connecting the forward end portion of said connecting member with said plow beam and adapted to have a cultivator blade secured thereto.

3. An attachment for a plow beam having a downwardly turned rearward end portion, comprising a substantially flat runner having the lower face thereof beveled at its forward end, an attaching member superimposed on the runner and secured thereto, said attaching member being formed with a longitudinal slot intermediate its length for the reception of the lower end portion of the plow beam, said lower end portion of the plow beam having a plurality of transversely spaced openings and said attaching member having a plurality of spaced transverse openings intersecting said vertical slot, a bolt adapted to be extended through aligned transverse openings of the attaching member at the lower end portion of the plow beam to pivotally attach the attaching member to the plow beam, a standard comprising a pair of spaced arms straddling the plow beam adjacent to the upper end and straddling the forward portion of the attaching member adjacent to the lower end and merged one into the other at the upper ends above the plow beam by a web portion, the lower end portions of said arms being pivotally attached to the forward end portion of said attaching member, the upper end portions of said arms having aligned transverse openings, a bolt adapted to be extended through aligned transverse openings in the upper end portion of said standard arms to span the space between the arms beneath said plow beam, and a clamping screw threaded in a vertical opening in the web portion of the standard against the upper side of the plow beam for cooperating with said last named bolt to secure the upper end portion of said standard to said plow beam, said standard arms having the front edges thereof concavely curved from their lower to their upper ends and adapted to support a cultivator blade thereon.

WILLIAM X J. GALES.
his mark